May 6, 1958 N. F. HINDLE ET AL 2,833,265
MEANS FOR PRODUCING EFFICIENT IGNITION AND COMBUSTION
IN INTERNAL COMBUSTION ENGINES
Filed March 19, 1956 2 Sheets-Sheet 1
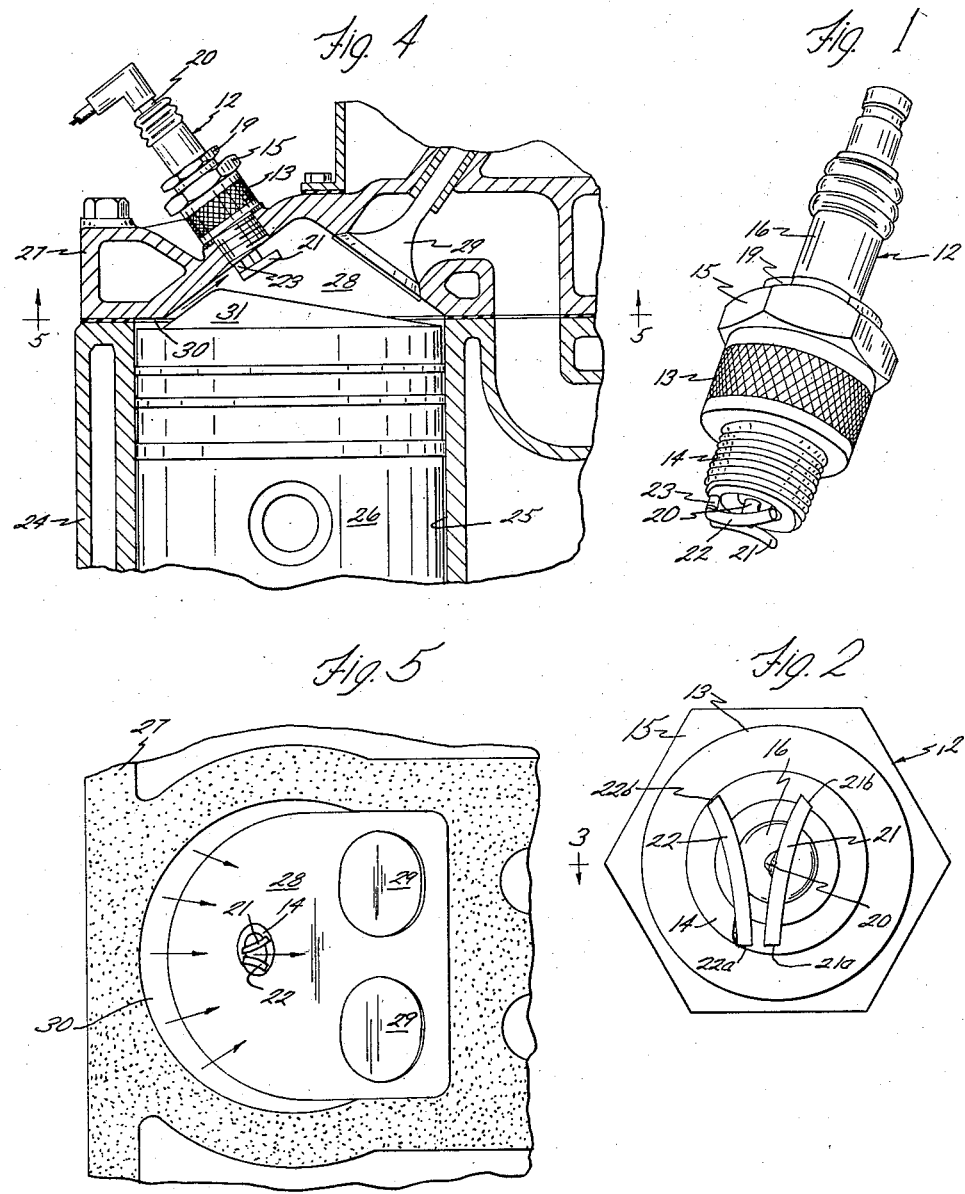
INVENTORS.
Norman F. Hindle
Charles D. King
William R. Parish
BY
Stuchwells
Atty.

May 6, 1958 N. F. HINDLE ET AL 2,833,265
MEANS FOR PRODUCING EFFICIENT IGNITION AND COMBUSTION
IN INTERNAL COMBUSTION ENGINES
Filed March 19, 1956 2 Sheets-Sheet 2
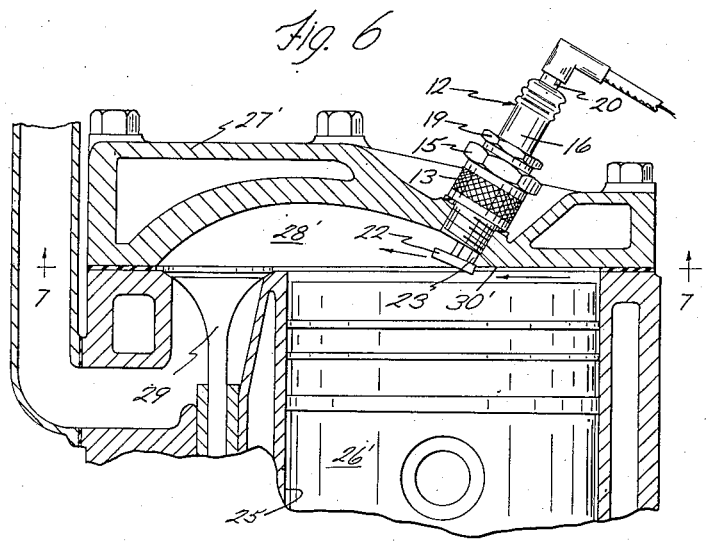
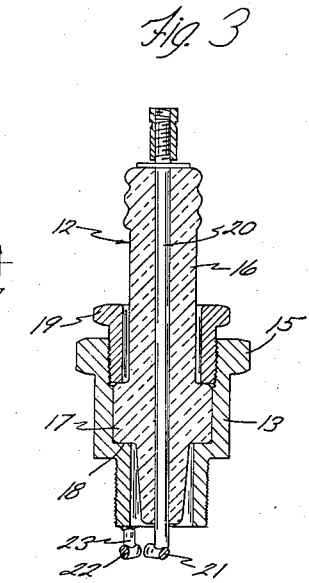
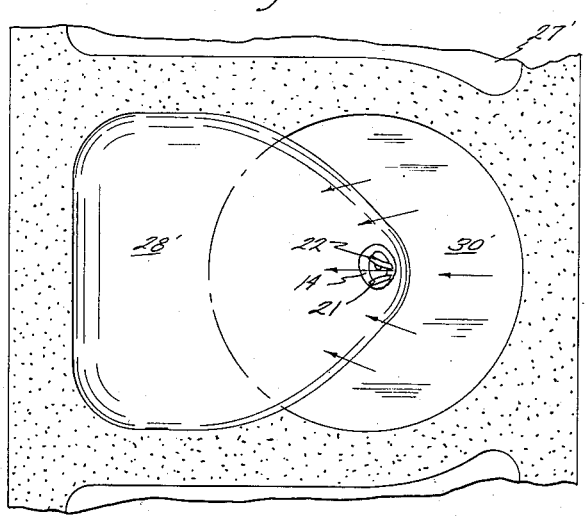
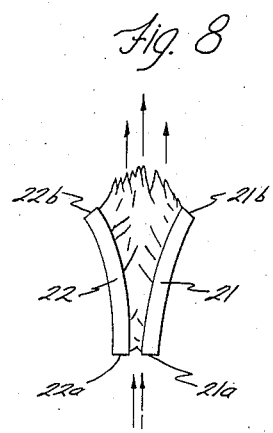
INVENTORS.
Norman F. Hindle
Charles D. King
William R. Parish
BY
Atty.

United States Patent Office 2,833,265
Patented May 6, 1958

2,833,265

MEANS FOR PRODUCING EFFICIENT IGNITION AND COMBUSTION IN INTERNAL COMBUSTION ENGINES

Norman F. Hindle, Charles D. King, and William R. Parish, Moscow, Idaho, assignors to University of Idaho Research Foundation Inc., Moscow, Idaho, a corporation of Idaho Application March 19, 1956, Serial No. 572,501

4 Claims. (Cl. 123—191)

The present invention relates to improvements in means for producing efficient ignition and combustion in internal combustion engines.

In present day internal combustion engines one of the most serious drawbacks and vexing problems is the low combustion efficiency, caused by incomplete and untimely combustion of gases in the combustion chamber. For optimum results the gas in the combustion chamber must be fully ignited while it is in a state of high compression, and when the piston it drives has reached the top of its stroke and is just beginning its downward movement. Incomplete combustion of the gas results in unburned gases and lowered efficiency. Premature or delayed combustion also results in lowered efficiency. Since the crankshaft of an internal combustion engines turns 30 degrees in one millisecond at 5000 R. P. M., the ignition timing must be very precise, and the ignition spark must fully ignite the compressed gases.

While present day methods make it possible to produce a spark at very nearly the correct instant that it should be produced, still full and proper combustion is not always produced. The gases in the combustion chamber comprise a mixture of vaporized fuel and air. The mixture is non-homogeneous due to incomplete fuel vaporization and incomplete mixing during the rapid manipulation of the fuel from the supply tank to the combustion chamber. Even though the total fuel-to-air ratio in the chamber may be within the proper limits for efficient combustion, that particular portion surrounding the spark producing electrodes of the spark plug may be of incorrect proportions to admit proper ignition. The spark produced between the spark plug electrodes lasts approximately one millisecond. During this time the gas turbulence within the combustion chamber may have corrected the local fuel-to-air ratio so that combustion is possible, but even so, the combustion may be somewhat delayed, resulting in faulty timing and loss of efficiency. Since the timeliness of combustion is dependent on the local fuel-to-air ratio, it is erratic, and cannot be corrected by adjustment of the ignition timing.

It is the principal purpose of this invention to provide means for increasing the volume of the produced spark to occupy a considerably greater volume in the combustion chamber, thereby increasing the probability that the local fuel-to-air ratio will be proper for combustion.

We have found that the arc discharge of a spark plug can be distorted and made to occupy a relatively large area by altering the electrode relationship from the conventional relationship found in present day spark plugs, and by producing the spark in a relatively high velocity stream of gas. More specifically, we have found that by providing a spark plug with a pair of elongated divergent electrodes in the combustion chamber, and by positioning these electrodes so that gas is directed betwen them in the direction of their divergence at a relatively high velocity, a spark existing between the electrodes at their closest points will be caused to spread the full length of the electrodes to occupy a relatively large area.

The nature and advantages of the invention will appear more clearly from the following description and the accompanying drawings, wherein a preferred form of the invention is shown. The drawings and description are illustrative only, however, and should not be considered as limiting the invention, except insofar as it is limited in the claims.

In the drawings:

Figure 1 is a perspective view of a spark plug equipped with elongated divergent electrodes according to our invention;

Figure 2 is an enlarged end view of the spark plug shown in Figure 1 and illustrating the electrode configuration;

Figure 3 is a vertical sectional view of the spark plug shown in Figures 1 and 2;

Figure 4 is a fragmentary sectional view taken through a cylinder of an internal combustion engine and illustrating the positioning of the spark plug electrodes within the combustion chamber;

Figure 5 is a sectional view taken substantially on the line 5—5 of Figure 4, looking up into the combustion chamber;

Figure 6 is a sectional view similar to Figure 4, but showing a different engine design;

Figure 7 is a sectional view taken on the line 7—7 of Figure 6; and

Figure 8 is a view showing the enlarged volume spark produced with our invention.

Referring now to the drawings, Figures 1, 2 and 3 illustrate a spark plug 12 having thereon a pair of electrodes made in accordance with our invention. The spark plug 12 is shown as being constructed in the usual manner. As shown in Figure 3, the plug 12 comprises a main body portion 13 having at the lower end thereof a reduced threaded sleeve 14, and having at its upper end a polygonal wrench receiving portion 15. The body portion 13 is tubular and receives therein an insulator 16. The insulator 16 extends entirely through the body 13 but has an intermediate enlarged section 17 which seats on a shoulder 18 in the body portion. A threaded sleeve 19 threads into the body 13 above the section 17 of the insulator 16 and clamps it in place. A conducting rod 20 extends through and is supported by the insulator 16. The rod 20 is exposed at each end of the insulator 16. According to our invention, an elongated, curved electrode 21, best shown in Figure 2, is affixed at the lower end of the rod 20 at a distance beyond the end of the threaded sleeve 14. The electrode 21 is of a length only slightly less than the outside diameter of the sleeve 14 and is affixed to the rod 20 centrally of its ends. The electrode 21 may be of any suitable conducting material and may be either circular or polygonal in cross section. A second curved electrode 22, substantially identical to the electrode 21 is positioned adjacent the electrode 21 so that its axis is in the plane of the axis of the electrode 21, and so that the two curve away from each other as shown in Figure 2. The electrode 22 is affixed to a post 23 of conducting material which is mounted to the end of the sleeve 14. As shown, the two electrodes 21 and 22 are so positioned that the ends 21a and 22a thereof are close together, while the ends 21b and 22b are spaced a considerable distance apart. The spacing of the ends 21a and 22a is substantially equal to the conventional spacing of spark plug electrodes so that a conventional voltage differential between the rod 20 and body 13 of the plug 12 will cause an arc discharge between the ends 21a and 22a. We have found that satisfactory results may be obtained when the electrodes 21 and 22 are positioned so that their ends 21a and 22a are spaced in the conventional range of from 0.025 inch to 0.04 inch, and so that the ends 21b and 22b are spaced about 0.25 inch apart. With this construction, the plug 12, when placed in a conventional automotive ignition circuit, will produce a spark of normal intensity between the electrode ends 21a and 22a.

The object of the invention is to expand this spark until it occupies a much greater volume. This is accomplished by causing the discharge to expand to completely fill the space between the divergent electrodes 21 and 22. We have found that if a relatively high velocity stream of gas is directed through the space between the electrodes from the ends 21a and 22a toward the divergent ends 21b and 22b, the spark can be spread until the discharge between the electrodes occupies the entire space therebetween. Such a spark is illustrated in Figure 8 of the drawings.

Figure 4 is a cross-sectional view through an internal combustion engine. As shown in Figure 4, the engine comprises a block 24 having a cylindrical aperture 25 therein into which a piston 26 is inserted. The piston 26 is adapted to move up and down in the aperture 25. The piston 26 is, of course, connected to a crank shaft and moved up and down thereby. A head member 27 is fixed on the block 24 to close the opening 25. The head 27 has a hollowed out combustion chamber 28 therein above the aperture 25. The chamber 28 has valves 29 therein for charging it with fuel and for exhausting burned fuel therefrom. In operation, fuel is introduced into the combustion chamber 28 together with a quantity of air, and the mixture is compressed by the upwardly moving piston 26. Just after the piston 26 reaches the top of its stroke, the fuel-air mixture is exploded and expanded to drive the piston down.

As stated earlier herein it is necessary to our invention to produce the spark between the electrodes 21 and 22 while a stream of gas is passing therebetween. Therefore, it is necessary that the gases being compressed in the combustion chamber 28 of the engine be made to move from one part thereof to another. This is accomplished by forming the combustion chamber 28 in such a manner that as the piston 26 nears the top of its stroke, it forces gas from one section of the chamber 28 toward the main section, to produce a turbulence and impart to the gas, what is known in the art as a "squish velocity." As shown in Figure 4, the combustion chamber is slightly offset from the cylinder 25, so that the top of the cylinder 25 is partially closed by a flat surface 30. When the piston 26 moves up, gases between the piston 26 and the flat surface 30 are squeezed out into the main portion of the chamber 28. This movement produces the "squish velocity." To increase the "squish velocity" effect, a shield 31 is fixed on top of the piston 26 to further restrict the space on the combustion chamber 28 when the piston 26 moves up. As may be seen, the "squish velocity" is directed toward the main portion of the chamber 28, in the direction of the arrows in Figures 4 and 5. The spark plug 12 is threaded into the head 27 so that the electrodes 21 and 22 are positioned directly in the path of the "squish velocity" gases. The plug 12 is aligned so that the electrodes 21 and 22 diverge in the direction of the moving gases and the ends 21a and 22a thereof are positioned to receive the "squish velocity" therebetween. The actual means for insuring proper alignment of the plug 12 in the head 27 forms no part of this invention. There are many known methods of accomplishing this; for example, spacing shims could be utilized. When the plug is screwed down tight in the head without regard to alignment of the electrodes 21 and 22, the farthest out of alignment these electrodes could be is 180 degrees. By placing one or more thin shims (not shown) between the plug and the head, the plug may be made to seat solidly when the electrodes are in proper alignment. The plug could also be made to seat solidly in proper alignment by cutting the threads 14 so that the plug will only seat solidly on the block when the electrodes are in proper alignment. With the electrodes 21 and 22 so aligned, the gases squeezed out of the restricted area of the chamber 28 as the piston reaches the top of its stroke, are forced through the electrodes 21 and 22 as the spark is produced. The spark is expanded to occupy the entire area between the electrodes, and, therefore, to occupy a significantly larger volume in the combustion chamber 28. As stated earlier herein, this results in a great increase in the probability that the local fuel-to-air ratio adjacent the spark will be proper for combustion. Combustion will be more timely and more complete.

Figures 6 and 7 show a different type of engine block 24', having a cylinder 25', a piston 26' and a head 27'. The head 27' has therein a combustion chamber 28'. As shown, the combustion chamber 28' is offset from the cylinder 25', leaving a flat surface 30' on the head 27' above a portion of the piston 26'. As the piston 26' approaches the top of its stroke the fuel and air mixture between the surface 20' and the piston 26' is squeezed into the main portion of the combustion chamber 28, producing a "squish velocity" as in the engine illustrated in Figures 4 and 5.

With the form of engine shown in Figures 6 and 7, the spark plug 12 is mounted in the chamber 28' adjacent the surface 30' so that the "squish velocity" stream is directed between the electrodes 21 and 22 from the ends 21a and 22a toward the divergent ends 21b and 22b. The velocity of the mixture flowing into the main portion of the chamber 28' expands the spark produced between the electrodes 21 and 22.

It is believed evident from the foregoing that our means for increasing the volume of the ignition spark in an internal combustion engine will increase the combustion efficiency of the engine by providing more uniform and more timely combustion. The particular configuration and construction of the plug 12 and its electrodes 21 and 22 shown in the drawings is merely representative. Other constructions are capable of operation equally as well. Also the particular construction of the combustion chamber 28 and the relation thereof to the cylinder 25 and piston 26 is merely representative. We do not intend that our invention should be limited to the constructions shown. The essential elements of the invention are two elongated electrodes which are divergent and which are so positioned in a combustion chamber that upon final compression of gases in the chamber, a relatively high velocity stream of gases is directed between the electrodes in the direction of their divergence.

We believe that the nature and advantages of our invention appear clearly from the foregoing description.

Having thus described our invention, we claim:

1. In an internal combustion engine having a cylinder, a piston in said cylinder, said cylinder having a combustion chamber at one end thereof, said piston operable to move toward said combustion chamber to compress gases therein, said piston and said cylinder having opposing surfaces that are moved into close juxtaposition as the piston is moved to the end of the cylinder having the combustion chamber therein whereby to cause the gases between said opposing surfaces to flow into the combustion chamber, the improvement comprising a spark plug mounted on said engine and having electrodes thereon exposed within the combustion chamber, said electrodes being positioned adjacent said opposing surfaces in the path of the flow of gases from said opposing surfaces, said electrodes being elongated in the direction of flow of the gases and diverging in the direction of said flow of gases.

2. In an internal combustion engine having a cylinder, a piston in said cylinder, said cylinder having a combustion chamber at one end thereof, said piston operable to move toward said combustion chamber to compress gases therein, said piston and said cylinder having opposed surfaces that are moved into close juxtaposition as the piston is moved to the end of the cylinder having the combustion chamber therein whereby to cause the gases between said opposing surfaces to flow into the combustion chamber, the improvement comprising a spark plug mounted on said engine and having electrodes thereon exposed within the combustion chamber, said electrodes being positioned adjacent said opposing surfaces in the path of the flow of gases from said opposing surfaces, said electrodes being elongated in the direction of the flow of gases and being positioned in a common plane, each electrode being curved away from the other electrode, and said electrodes diverging from each other in the direction of the flow of gases.

3. In an internal combustion engine, the combination of a cylinder having a combustion chamber at one end thereof, a piston movable in said cylinder toward and away from said combustion chamber, said piston and said cylinder having opposed surfaces that are moved into close juxtaposition as the piston is moved to the end of the cylinder having the combustion chamber therein whereby to cause the gases between said opposed surfaces to flow into the combustion chamber, a spark plug mounted on said engine and having electrodes thereon exposed in said combustion chamber, said electrodes being positioned adjacent said opposing surfaces in the path of the flow of gases from said opposing surfaces, said electrodes being elongated in the direction of flow of said gases and diverging in the direction of said flow of gases.

4. In an internal combustion engine, the combination of a cylinder having a combustion chamber at one end thereof, a piston movable in said cylinder toward and away from said combustion chamber, means in the engine to direct a flow of gases into the combustion chamber, a spark plug mounted on said engine and having electrodes thereon exposed in said combustion chamber, said electrodes being positioned in the path of the flow of gases, said electrodes being elongated in the direction of flow of said gases and diverging in the direction of said flow of gases.

References Cited in the file of this patent

UNITED STATES PATENTS

| | | |
|---|---|---|
| 1,131,115 | Carpentier | Mar. 9, 1915 |
| 2,109,364 | Gornemann | Feb. 22, 1938 |
| 2,457,973 | Blau | Jan. 4, 1949 |
| 2,742,032 | Wyczalek | Apr. 17, 1956 |
| 2,749,901 | Mitchell | June 12, 1956 |

FOREIGN PATENTS

| | | |
|---|---|---|
| 464,795 | Italy | July 21, 1951 |